US012797943B2

(12) United States Patent
Jendrny et al.

(10) Patent No.: US 12,797,943 B2
(45) Date of Patent: Nov. 17, 2026

(54) POSITIONING AND REFERENCING DEVICE FOR CLAMPING PARTS

(71) Applicant: Airbus Operations GmbH, Hamburg (DE)

(72) Inventors: Jörg Jendrny, Hamburg (DE); Eugen Gorr, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 319 days.

(21) Appl. No.: 18/594,449

(22) Filed: Mar. 4, 2024

(65) Prior Publication Data

US 2024/0307951 A1 Sep. 19, 2024

(30) Foreign Application Priority Data

Mar. 16, 2023 (EP) ..................................... 23162261

(51) Int. Cl.
*B25B 11/00* (2006.01)
*B21J 15/42* (2006.01)
*G06K 19/06* (2006.01)

(52) U.S. Cl.
CPC ........ *B21J 15/42* (2013.01); *G06K 19/06009* (2013.01); *G06K 2019/06253* (2013.01); *G06K 2019/06262* (2013.01)

(58) Field of Classification Search
CPC ..... G06K 19/06009; B25B 11/00; B21J 15/42
See application file for complete search history.

(56) References Cited

U.S. PATENT DOCUMENTS

| | | | | |
|---|---|---|---|---|
| 4,945,488 | A | 7/1990 | Carver et al. | |
| 6,230,382 | B1 | 5/2001 | Cunningham et al. | |
| 2015/0219451 | A1 | 8/2015 | Pettersson et al. | |
| 2021/0339888 | A1* | 11/2021 | Jackson | B64F 5/10 |
| 2023/0296375 | A1* | 9/2023 | Peters | G01B 11/275 356/139.09 |
| 2024/0307951 | A1* | 9/2024 | Jendrny | G06K 19/06009 |

FOREIGN PATENT DOCUMENTS

| | | | |
|---|---|---|---|
| DE | 102020122565 | B3 | 1/2022 |
| EP | 2698596 | A1 | 2/2014 |

OTHER PUBLICATIONS

European Search Report for corresponding European Patent Application No. 23162261.4 dated Aug. 30, 2023.

* cited by examiner

*Primary Examiner* — Lee D Wilson
(74) *Attorney, Agent, or Firm* — Greer, Burns & Crain, Ltd.

(57) ABSTRACT

A positioning device including a plate having a first side and a second side opposite to the first side, a guiding pin mounted to the plate and extending perpendicularly from the first side of the plate, and an expandable pin mounted to the plate. An expandable portion of the expandable pin extends perpendicularly from the first side of the plate. The positioning device further includes at least two reflectors, and an identifier. The at least two reflectors and the identifier are not located on a common straight line. Furthermore, a method for mounting two structural parts to one another using such positioning device is provided.

13 Claims, 8 Drawing Sheets

POSITIONING AND REFERENCING DEVICE FOR CLAMPING PARTS

CROSS-REFERENCES TO RELATED APPLICATIONS

This application claims the benefit of the European patent application No. 23162261.4 filed on Mar. 16, 2023, the entire disclosures of which are incorporated herein by way of reference.

BACKGROUND OF THE INVENTION

The present disclosure generally relates to a positioning device and method for mounting two structural parts to one another using such positioning device. Particularly, the present disclosure relates to a positioning device having at least two reflectors and an identifier not located on a common straight line, and a method employing such positioning device when mounting two structural parts to one another.

When two structural parts are to be mounted to one another, such as two primary structural parts of a vehicle (e.g., an aircraft, a bus, a train, etc.), the two structural parts are placed in the correct (overlapping) position and are temporarily clamped to one another. A fastening device can be moved to a first fastening position, where the fastening device can couple and mount the two structural parts to one another. Subsequently, the fastening device is moved to a second fastening position, and so on until fasteners are placed at all fastening positions.

A semi-automatic process can be employed, where the moving to the respective fastening position can be performed manually and the placing of the fasteners is performed automatically. Alternatively, a first fastener can be placed manually, in order to fixedly couple both primary structural parts, and the remaining fasteners are placed automatically.

However, the installation time of such a procedure is quite long. Moreover, if the starting (overlapping) position of the primary structural parts is not correct at the time of placing the first fastener, both parts will be mounted to one another in this incorrect position.

It is therefore an object of the present disclosure to improve mounting two structural parts to one another, while increasing precision and efficiency of the fastening.

SUMMARY OF THE INVENTION

According to a first aspect to better understand the present disclosure, a positioning device comprises a plate forming a main body of the positioning device having a first side and a second side opposite to the first side. The plate, or at least one of the first and second side, can be planar. Alternatively, the plate, or at least one of the first and second side, can be curved. In any case, the plate can be shaped to fit onto a surface of one of the first and second structural parts.

The positioning device further comprises a guiding pin mounted to the plate and extending perpendicularly from the first side of the plate, and an expandable pin mounted to the plate, wherein an expandable portion of the expandable pin extends perpendicularly from the first side of the plate. Thus, the guiding pin and the expandable pin are provided on the same side of the plate and constitute a guiding and mounting assembly for the positioning device.

Furthermore, the positioning device comprises at least two reflectors, and an identifier. The at least two reflectors and the identifier are not located on a common straight line. In other words, the at least two reflectors and the identifier can each be arranged at a corner of a polygon. For instance, in case of two reflectors and the identifier, the three items form a triangle. Since the items are not arranged on one straight line, at least a two-dimensional orientation of the positioning device can be determined when looking at the at least two reflectors and the identifier.

As a mere example, if the positioning device is mounted to a structural part, where the plate touches or abuts against a surface of the structural part, while the guiding pin and the expandable pin penetrate the structural part, the at least two reflectors and the identifier allow determining a spatial position and orientation of the structural part. This can be employed, for example, during fastening the structural part to another component, as the position and orientation of the structural part can be determined.

In an implementation variant, the at least two reflectors are all arranged on the second side of the plate. This allows detecting all reflectors from one side of the plate, i.e., from one side of the structural part, to which the positioning device can be mounted.

Alternatively, one reflector of the at least two reflectors is arranged at a free end of the guiding pin arranged on the first side of the plate, and the remaining reflectors of the at least two reflectors are arranged on the second side of the plate. This allows the (first) one reflector on the first side of the plate to be detected on a side of the structural part opposite to a side where the positioning device is mounted. As a mere example, the position and orientation of the positioning device, and hence of the structural part, can be determined when viewing at the structural part and the positioning device from a location close to a plane defined by the plate.

In another implementation variant, the positioning device can further comprise a clamp mounted to the second side of the plate. Such clamp can be used to hold or fix another structural part to the positioning device and, hence, to the (first) structural part at which the positioning device is mounted. Thus, the positioning device does not only allow determination of the position and orientation of the (first) structural part. The positioning device also allows coupling both structural parts to one another in a predefined position and orientation. For example, both structural parts may be positioned and oriented with respect to one another, so that they can be fastened to one another.

In yet another implementation variant, the clamp can comprise a free end extending over an edge of the plate. This allows placing the other structural part onto the same side or surface of the (first) structural part, on which the positioning device is mounted. The clamp can then be used to hold and temporarily fix the other structural part, for example, in a position for fastening.

In a further implementation variant, the clamp can comprise a slot configured to move the clamp rotationally and linearly. This allows positioning the clamp, for example its free end, with respect to the other structural part. The holding capability of the positioning device can, hence, be optimized.

In an implementation variant, the positioning device can further comprise at least one guidance face protruding from the plate. Such guidance face can protrude from the plate at a position corresponding to a section or portion of the structural device, to which the positioning device can be mounted. The positioning device can therefore be positioned on the structural device in a very precise manner, since more contacting points or areas between the positioning devices and the structural part are provided.

Alternatively or additionally, the guidance face can protrude from the plate at a position corresponding to a section or portion of another structural device. If the guidance face is in contact with another structural part, the relative position between both structural parts can be more precise, which improves fastening of both structural parts to one another.

In another implementation variant, the identifier can include a reflecting portion and/or a machine-readable code. The identifier can also be used for determining a position and orientation of the positioning device, since the identifier marks a predefined position on the positioning device. This may be facilitated by the reflecting portion of the identifier. For instance, the reflecting portion may be determined in the same manner as the at least two reflectors, so that all three items look similar.

The machine-readable code can be any code that allows mapping the code to an unambiguous number or character combination. As mere examples, the machine-readable code can be or include a barcode, QR code, unique image, unique color or the like. Thus, simultaneously with identifying the at least two reflectors and the identifier, the positioning device can be identified. This further allows identifying a group of positioning devices having all the same identifier, or identifying each individual positioning device out of the group of positioning devices, where each positioning device has its unique identifier. As a mere example, based on the identification the position of fasteners at the structural part(s) can be determined. Thus, the positioning device can be matched to the structural parts.

According to a second aspect to better understand the present disclosure, a method for mounting two structural parts to one another comprises providing a pair of fixation holes into a first structural part, and mounting a positioning device according to the first aspect or one of its variants to the first structural part. The pair of fixation holes are provided at respective predefined positions on the first structural part. For instance, the positions of the fixation holes are predefined, such as relative to an end or edge or the like of the first structural part. Thus, the position of any device mounted to such fixation hole can be determined relative to the shape of the first structural part or any other referenced location on the first structural part.

The fixation holes can be provided by machining, drilling or eroding the material of the first structural part. Alternatively, the fixation holes may already be provided when manufacturing the first structural part. For example, the first structural part may be molded. Two protrusions in the mold can then form the pair of fixation holes.

The positioning device is mounted to the first structural part by inserting the guiding pin into a first hole of the pair of fixation holes, inserting the expandable pin into a second hole of the pair of fixation holes, and expanding the expandable portion of the expandable pin. Thus, the plate of the positioning device is coupled and fixed (mounted) to the first structural part in a predefined position and orientation. The positioning device can, hence, also be referred to as a referencing tool or device. The more precise the fixation holes are made, the more precise is the predefined location and orientation of the positioning device relative to the first structural device.

The method further comprises positioning a second structural part relative to the first structural part, capturing an image of the positioning device including the at least two reflectors and the identifier, and arranging a fastening device relative to an intersection between the first and second structural parts based on a location of the at least two reflectors and the identifier captured in the image. Since the location of the at least two reflectors and the identifier captured in the image and the location of the pair of fixation holes is known, this altogether identifies the position and orientation of the positioning device. Thus, the position and orientation of the first structural part can be determined based on the location of the at least two reflectors and the identifier captured in the image. Furthermore, the respective shape of the first and second structural parts can also be predefined, so that the fastening device can be precisely arranged (positioned) relative to the first and second structural parts.

The intersection between the first and second structural parts includes an area, where the first and second structural parts overlap. For instance, the first and second structural parts may each have an area that abuts against each other and forms an area where fastening positions for fasteners can be predefined.

The method can further comprise fastening the first and second structural parts to one another by the fastening device. The positioning device mounted to the first structural part facilitates a precise arranging and positioning of the fastening device, i.e., facilitates a precise locating of a fastening position at the first and second structural parts.

Thus, a precise fastening of the first and second structural parts is possible. It is additionally possible to automate this fastening process, as camera images can be evaluated by an automatic fastening device, in order to determine the position and orientation of the positioning device and the structural parts. Thus, once the structural parts are brought into the correct position, an automatic fastening device can operate solely based on images of the reflectors and identifier of the positioning device.

In an implementation variant, the capturing an image can comprise capturing a first image of the positioning device with a first camera and a second image of the positioning device with a second camera. The position of the first camera and the second camera with respect to one another and/or with respect to the fastening device can be predefined. Thus, the position and orientation of the positioning device and, hence, the first and second structural parts in a three-dimensional space can be determined using triangulation.

In a further implementation variant, the positioning the second structural part can comprise clamping the second structural part to the first structural part using a clamp of the positioning device. Thus, the positioning device, the position and orientation of which is known or at least determinable, further allows positioning the second structural part relative to the first structural part in a (also determinable) position and orientation.

In yet a further implementation variant, the mounting the positioning device can comprise inserting the guiding pin through the first hole of the pair of fixation holes to such an extent that a first reflector arranged at one end of the guiding pin and a second reflector arranged at the other end of the guiding pin each extend over a side surface of the first and second structural parts. As a mere example, the first and/or second structural part may have a certain thickness in a direction along which the guiding pin extends. This thickness of the first and/or second structural part is smaller than a length of the guiding pin or a distance between the first and second reflector.

The fastening device can, for example, be a fastening clamp (a U-shaped device) that moves over the first and second structural parts, so that the ends of the fastening clamp are arranged at each of the side surfaces of the first and second structural parts. In this position, a camera can capture an image of the first and second reflector respectively arranged on the sides of the ends of the fastening clamp, so that the position and orientation of the positioning device is determinable from the camera perspective.

In another implementation variant, the fastening the first and second structural parts can comprise placing a plurality of self-piercing fasteners through the first and second structural parts. Such self-piercing fasteners allow a fast fastening of the first and second structural parts, as no through holes have to be formed first.

Moreover, even if more than two structural parts are fastened to one another, this can be achieved by this method, including self-piercing fasteners.

In yet another implementation variant, the fastening device can be moved by a robot arm. The robot arm can further be controlled based on an image captured by one or more cameras looking at the positioning device.

The present disclosure is not restricted to the aspects and variants in the described form and order. Specifically, the description of aspects and variants is not to be understood as a specific limiting grouping of features. It is to be understood that the present disclosure also covers combinations of the aspects and variants. Thus, each variant or optional feature can be combined with any other aspect, variant, optional feature or even combinations thereof.

BRIEF DESCRIPTION OF THE DRAWINGS

In the following, the present disclosure will further be described with reference to exemplary implementations illustrated in the figures, in which.

DETAILED DESCRIPTION OF THE PREFERRED EMBODIMENTS

In the following description, for purposes of explanation and not limitation, specific details are set forth in order to provide a thorough understanding of the present disclosure. It will be apparent to one skilled in the art that the present disclosure may be practiced in other implementations that depart from these specific details.

Figure 1:
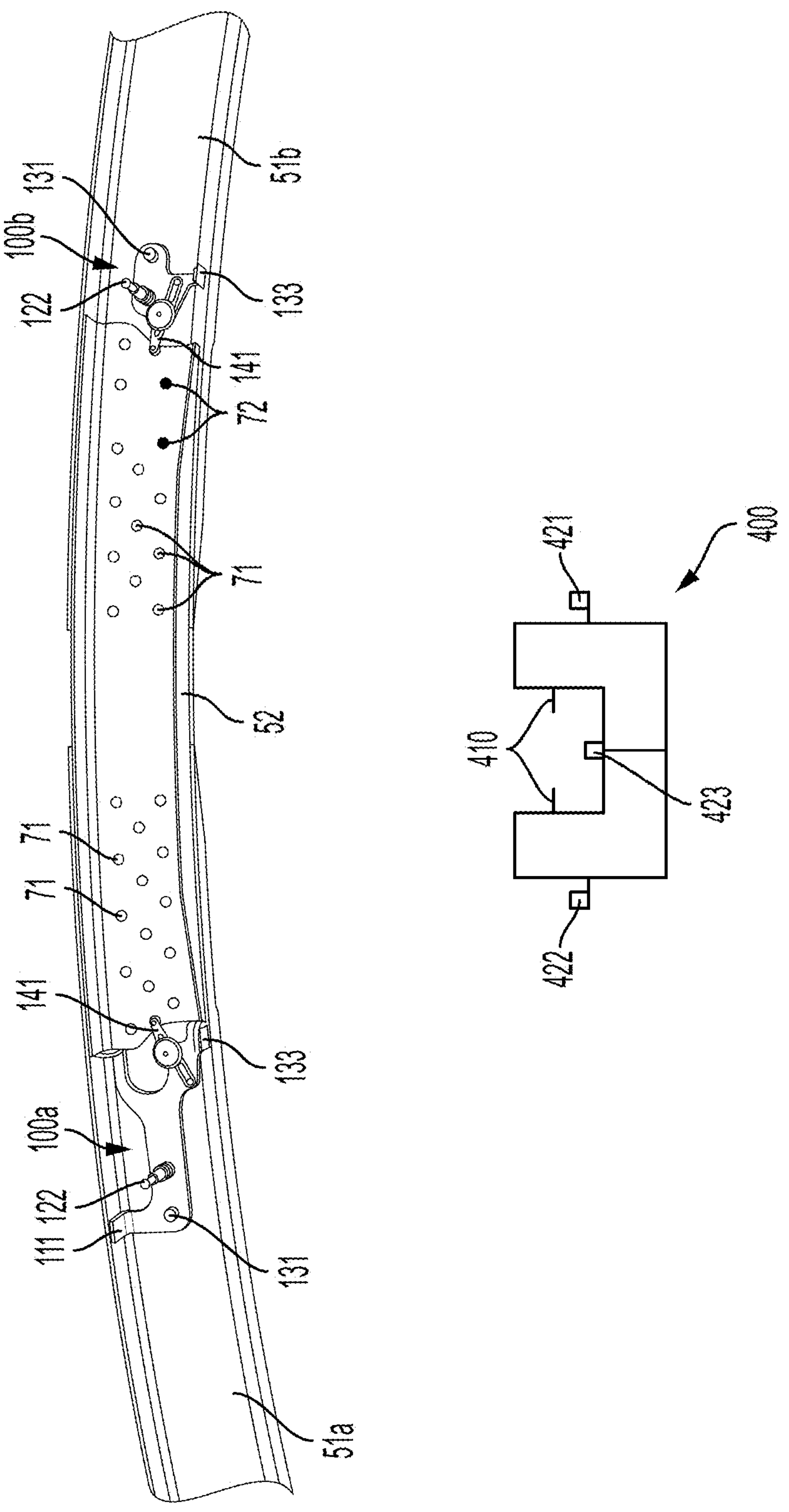
FIG. 1 schematically illustrates two structural parts that are to be mounted to one another with a coupling, using positioning devices and a fastening device.

FIG. 1 schematically illustrates two structural parts 51*a* and 51*b* that are to be mounted to one another with a coupling 52, using positioning devices 100*a* and 100*b*, and a fastening device 400. The two structural parts 51*a,b* can either overlap one another, or are coupled to one another, as illustrated, via a coupling 52, which overlaps a respective area of the structural parts 51*a,b*. In any case, in an overlap area, a plurality of fastening positions 71 are predefined. At each of these fastening positions 71 a fastener 72 is to be placed, such as a rivet, a screw, self-piercing fastener, a bolt or the like. Each of the fasteners 72 penetrates the first structural part 51 and the overlapping part 52, in order to bind and fix both parts 51, 52 to one another. This can additionally be supported by (automatically) drilling a through hole at each fastening position 71, or having an "unclosed" rivet already placed at each fastening position 71 that can then be closed to fasten the two structural parts 51*a,b* to one another.

The fastening device 400 can be a U-shaped device, such as a clamp, having a fastener placing device 410 at each free end of the U-shaped clamp. As a mere example, the fastener placing device 410 can be implemented as a riveting device that provides a rivet or a self-piercing fastener 72 through the two structural parts 51, 52 to be coupled to one another. Each free end of the fastening device 400 is to be placed on one of the opposite sides of one of the fastening positions 71 (in FIG. 1 only one side is visible). The fastener placing device 410 can then operate from both sides of the two structural parts 51, 52.

In conventional fastening techniques, the structural parts 51, 52 have to be held or clamped to one another. Thereafter, a first fastener 72 has to be provided, so that the two parts 51, 52 are fixed. Then further fasteners 72 can be provided at other fastening positions 71.

In order to increase efficiency and precision of the fastening of the structural parts 51, 52, a positioning device 100*a,b* is provided for each pair of structural parts 51, 52. FIG. 1 illustrates a first positioning device 100*a* that is mounted to a first structural part 51*a*, and a second positioning device 100*b* that is mounted to a second structural part 51*b*. The details of the positioning devices 100*a,b* are explained with respect to FIGS. 3 to 6.

Both positioning devices 100*a,b* are mounted to a predefined position at/on the respective structural part 51*a,b*. Thus, the location and orientation of both positioning devices 100*a,b* can be determined, which further allows determining the location and orientation of the respective structural parts 51*a,b*.

Moreover, the positioning devices 100*a,b* are each provided with a clamp 141 (see FIGS. 3 to 6). This clamp 141 can press the coupling 52 onto the respective structural part 51*a,b*. Thus, the coupling 52 can be hold and fixed by only one device, i.e., the positioning device 100, before the coupling 52 is fastened to the structural part 51.

The first positioning device 100*a* (to the left in FIG. 1) additionally comprises at least one guidance face 111, 112, 113 (see FIGS. 3 and 4), which allows abutting the coupling 52 against it. Thus, the coupling 52 can be oriented with respect to the positioning device 100*a* and, hence, with respect to the structural part 51*a*.

Figure 2:
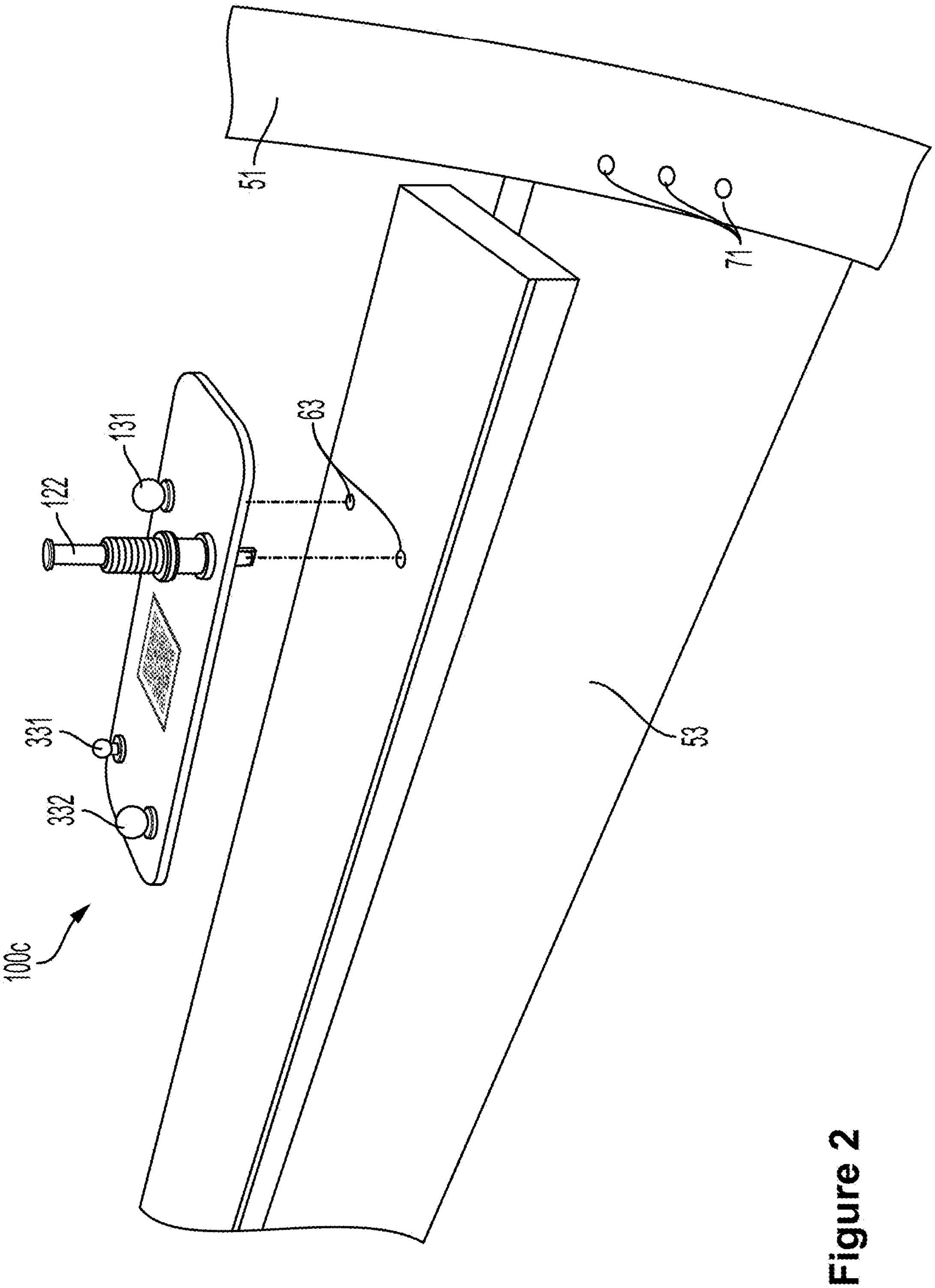
FIG. 2 schematically illustrates two structural parts that are to be mounted to one another, using a positioning device.

FIG. 2 schematically illustrates two structural parts 51, 53 that are to be mounted to one another, using a positioning device 100*c*. The positioning device 100*c* is mounted to one of the two structural parts, here a crossbeam 53. The details of the positioning device 100*c* are illustrated in and explained with respect to FIGS. 7 and 8.

Figure 3:
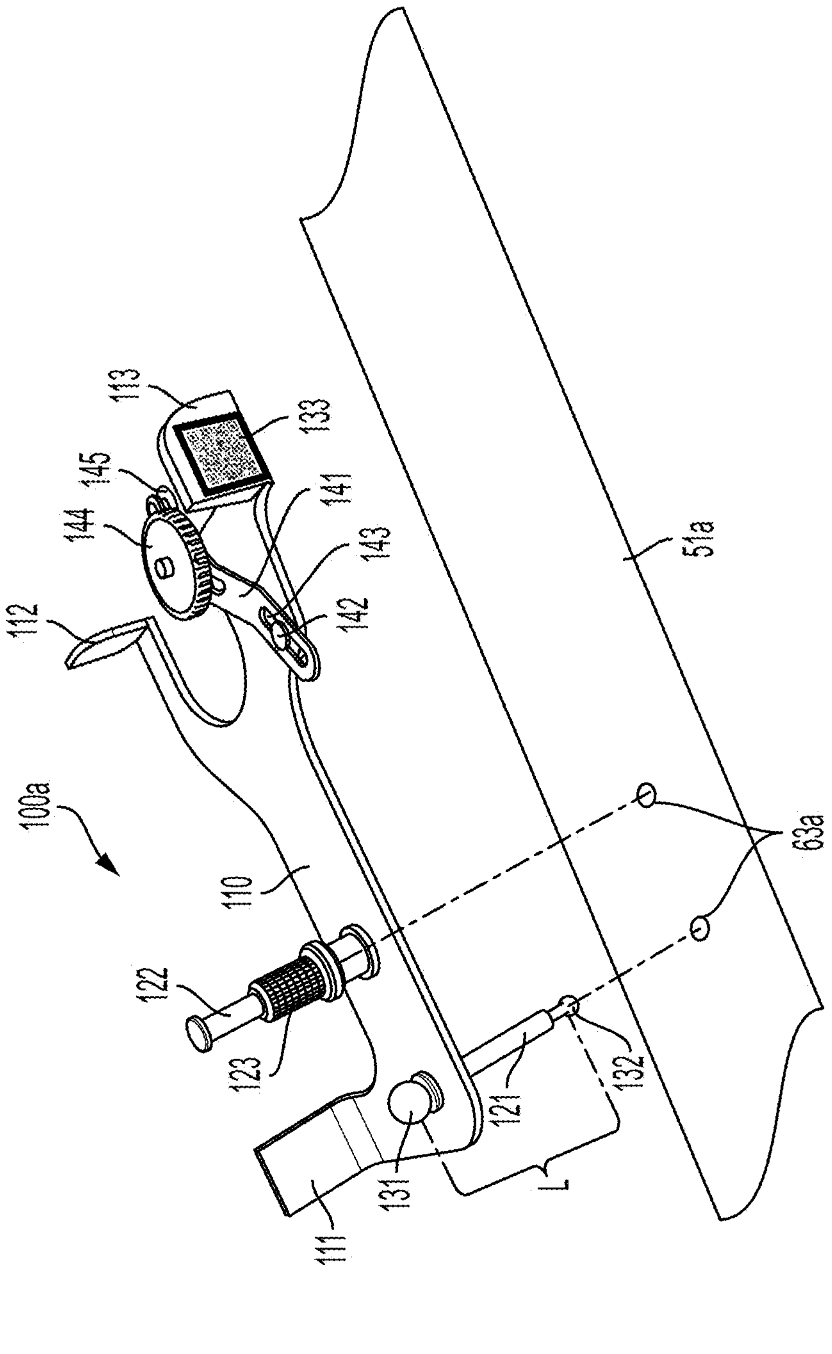
FIG. 3 schematically illustrates an exemplary positioning device relative to a structural part.
Figure 4:
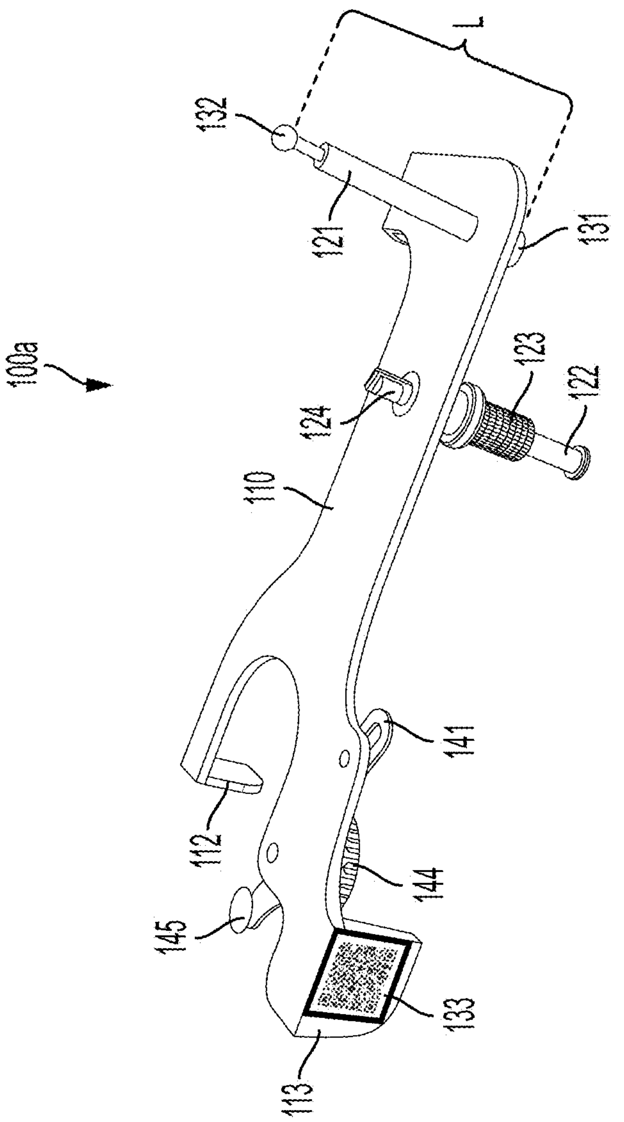
FIG. 4 schematically illustrates a different perspective of the positioning device of FIG. 3.

As indicated above, FIG. 3 schematically illustrates a positioning device 100*a* relative to a structural part 51. FIG. 4 schematically illustrates a different perspective of the positioning device 100*a*. The structural part 51 (not illustrated in FIG. 4) is provided with a pair of fixation holes 63, which can be, for example, through holes. Such fixation holes 63 can be made with high precision, particularly with respect to diameter and relative position to one another as well as relative position to a particular edge, corner and/or side face of the structural part 51. Thus, the pair of fixation holes 63 allows determining a position and an orientation of the structural part 51 in a three-dimensional space and, hence, the corresponding position and orientation of the edge, corner and/or side face of the structural part 51.

The positioning device 100*a* comprises a plate 110 that forms the main body of the positioning device 100. The plate 110 has a first side (visible in FIG. 4) and a second side (visible in FIG. 3) opposite to the first side. A guiding pin 121 is mounted to the plate 110 and extends perpendicularly from the first side of the plate 110. The guiding pin 121 has a length L, the major part of which extends from the first side.

The positioning device 100 further comprises an expandable pin 122 mounted to the plate 110 and having an expandable portion 124 that also extends perpendicularly from the first side of the plate 110. The relative position of the expandable pin 122 to the guiding pin 121 is predefined and should be made with high precision. Furthermore, the relative position of the expandable pin 122 and the guiding pin 121 corresponds to the relative position of the pair of fixation holes 63 in the structural part 51.

Thus, the guiding pin 121 can be inserted into a first hole of the pair of fixation holes 63, and the expandable pin 122 can be inserted into a second hole of the pair of fixation holes 63 (simultaneously). The expandable portion 124 of the expandable pin 122 can be expanded, for example when the expandable portion 124 is arranged inside the associated fixation hole 63 or on the first side of the plate 110. The expanding of the expandable portion 124 can be achieved, for example, by rotating an associated mechanic 123, such as a screw or threaded bolt. This task can be performed by a tool (not illustrated) used by a person or robot (not illustrated).

In any case, the expandable portion 124 fixes the plate 110 to a surface of the structural part 51. The expandable portion 124 can be configured to pull the plate 110 onto the surface of the structural part 51. In any case, the positioning device 100 is now mounted to the structural part 51 in a predefined position due to the predefined location of the fixation holes 63 (see FIGS. 1 and 3).

Furthermore, the positioning device 100*a* comprises at least two reflectors 131, 132. As a mere example, the two reflectors 131, 132 are respectively arranged at opposite ends of the guiding pin 121. Thus, when the positioning device 100*a* is mounted to the structural part 51, each reflector 131, 132 is located on opposite sides of the structural part 51. With reference to FIG. 1, the reflector 131 is visible on the side where the positioning device 100*a* is mounted, while the other reflector 132 is visible on the opposite side. For instance, a camera 421, 422, 423 can capture an image of the positioning device 100 including the at least two reflectors 131, 132.

In FIG. 1 three optional cameras 421, 422, 423 are illustrated as forming part of the fastening device 400. It is to be understood that this is only one of a plurality of possible arrangements for the camera(s) 421, 422, 423. For instance, one or more of the camera(s) 421, 422, 423 can also be arranged at a robot arm or the like.

According to a further example, a camera 423 may capture an image from an underside of the structural part 51*a* (i.e., the camera 423 has a viewing direction from the bottom to the top in FIG. 1). It is further assumed that the length L of the guiding pin 121 is longer than the thickness of the structural part 51*a*. In this case, the camera 423 captures the first reflector 131 on a right-hand side of the structural part 51*a*, and the second reflector 132 on the left-hand side of the structural part 51*a*. Thus, when arranging the fastening device 400 at one of the fastening positions 71, the position and orientation of the positioning device 100*a* and, hence, of the structural part 51*a*, can be determined from the captured image. Therefore, a precise positioning of the fastener placing device 410 with respect to the fastening positions 71 can be achieved.

The positioning device 100*a* further comprises an identifier 133, which is located offside of the straight line connecting the two reflectors 131, 132. Thus, a triangle of predefined positions can be captured by a camera, which facilitates determination of the position and orientation of the positioning device 100*a* and, hence, of the structural part 51*a*. The identifier 133 may include a machine-readable code, such as a barcode, QR code, unique image, unique color or the like. Alternatively or additionally, the identifier 133 may include a reflector, for example, having the same reflecting capabilities as the first and second reflectors 131, 132.

Furthermore, the positioning device 100*a* comprises at least one guidance face 111, 112, 113 protruding from the plate 110. Protruding from the plate 110 can mean extending away from the plate 110 at any desired angle, so that the respective guidance face 111, 112, 113 extends away from a plane defined by the plate 110. Each guidance face 111, 112, 113 can be positioned on the positioning device 100*a*, so that it has a particular relative position to the guiding pin 121 and the expandable pin 122, such as a predefined relative position.

One guidance face 113 can be used as locating the identifier 133. For instance, if the guidance face 113 faces a direction where a camera will capture an image of the first and second reflectors 131, 132, then the identifier 133 is also visible for the camera.

Furthermore, each guidance face 111, 112, 113 can be arranged and employed to contact or abut against a portion of one or more of the structural parts 51, 52. Again with reference to FIG. 1, a guidance face 111 may abut against a flange of the structural part 51*a*. Another guidance face 112 may abut against the flange of the structural part 51*a* and may further abut against a side/front face of the coupling 52. Likewise, another guidance face 113 may abut against the side/front face of the coupling 52 (preferably at a different position than the other guidance face 112).

Thus, the positioning device 100 does not only allow to be mounted to the structural part 51 in a predefined position. The positioning device 100 further allows positioning the coupling 52 including transferring any forces from the coupling 52 to the structural part 51 via the guidance faces 111, 112, 113 (as well as the plate 110, the guiding pin 121 and the expandable pin 122).

The positioning device 100*a* can be specifically shaped for the coupling 52. Since a plurality of structural parts, for example in a vehicle, can have the same form and shape, the same positioning devices 100 can be used. It is to be understood that the positioning device 100 can have any form and shape, in order to facilitate positioning, orienting and fastening two structural parts 51, 52, 53 to one another.

Moreover, the positioning device 100 can include a clamp 141 mounted to the second side of the plate 110. The clamp 141 can comprise a slot 143, through which a button 142 runs, to connect the clamp 141 to the plate 110. The slot 143 allows a rotational and linear movement of the clamp 141 with respect to the plate 110. A free end 145 of the clamp 141 (preferably opposite to the end where the slot 143 is arranged) can be arranged, so that it extends over an edge of the plate 110. This free end 145 can be provided in a position overlapping the coupling 52 or another structural part 51, 53.

Using a clamping fixture 144, the free end 145 can be pressed onto the coupling 52 or other structural part 51, 53. The clamping fixture 144, for example, can be a screw or threaded bolt. Thus, the clamp 141 can fix the coupling 52 or other structural part 51, 53 to the structural part 51*a*, on which the positioning device 100*a* is mounted.

When the first and second structural parts 51, 52 are coupled and fixed to one another in the correct position, the image of the positioning device 100 including the at least two reflectors 131, 132 and the identifier 133 can be captured, and the fastening device 400 can be arranged relative to an intersection/overlap between the first and second structural parts 51, 52 based on a location of the at least two reflectors 131, 132 and the identifier 133 captured in the image. Then the first and second structural parts 51, 52 can be fastened to one another by the fastening device 400, for example, by placing a plurality of fasteners 72 through the first and second structural parts. Such fasteners 72 can be self-piercing fasteners, rivets, screws or the like. The fastening device 400 can be controlled by a robot (robot arm), so that an automated fastening of the structural parts 51, 52 can be implemented.

Figure 5:
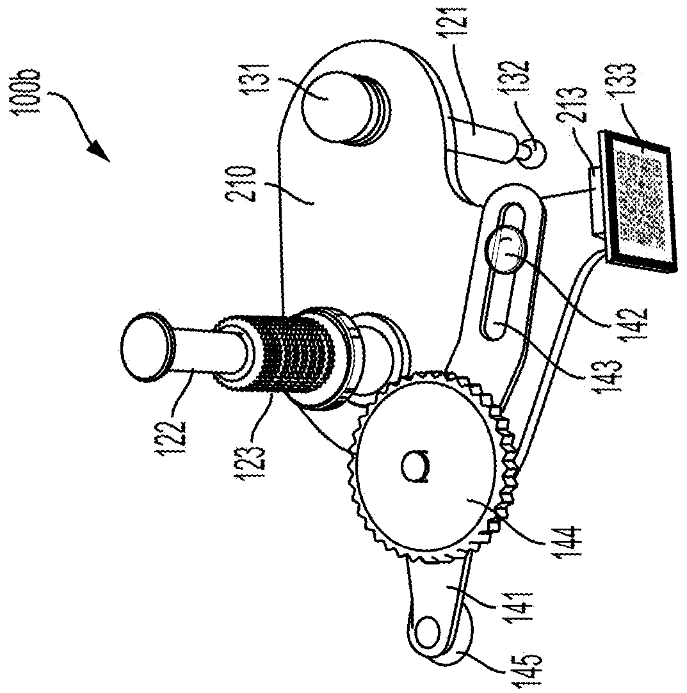
FIG. 5 schematically illustrates another exemplary positioning device.
Figure 6:
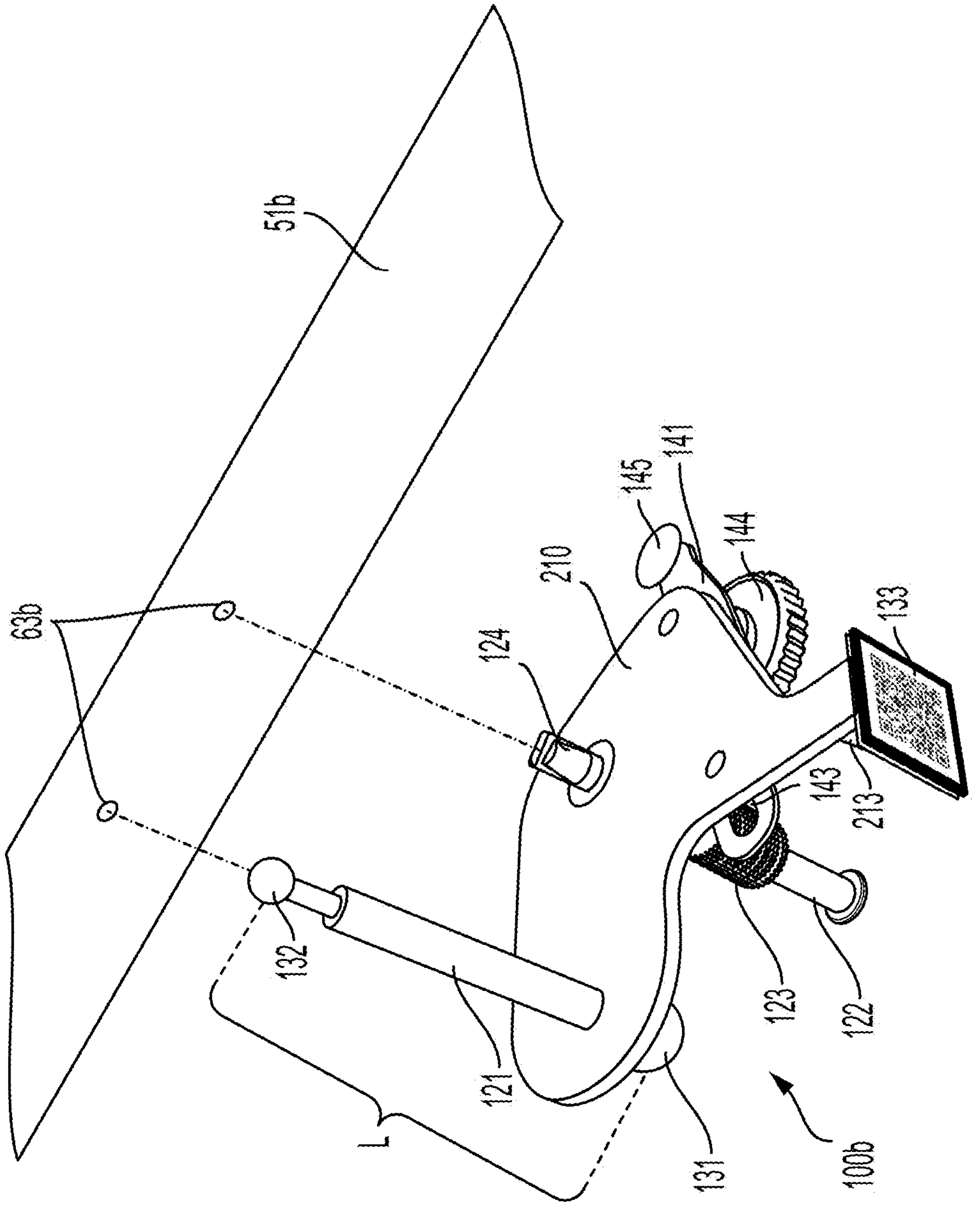
FIG. 6 schematically illustrates a different perspective of the positioning device of FIG. 5 and relative to a structural part.

FIG. 5 schematically illustrates another positioning device 100*b*, such as the positioning device 100*b* arranged on the right-hand side in FIG. 1. The positioning device 100*b* can be used to position and fix another structural part 51*b* to the coupling 52. FIG. 6 schematically illustrates a different perspective of the positioning device 100*b* of FIG. 5 and relative to the structural part 51*b*. The positioning device 100*b* has several portions and components that are (at least functionally) identical to those of the positioning device 100*a* as explained with respect to FIGS. 3 and 4. These portions and components are not explained again, in order to avoid redundant disclosure, and have been referenced by the same numerals.

The positioning device 100*b* comprises a plate 210, which is formed smaller than that of positioning device 100*a*. For instance, the plate 210 can be formed and shaped with respect to constraints at the second structural part 51*b* and/or this side of the coupling 52. Nevertheless, a guiding pin 121 and an expandable pin 122 are part of the positioning device 100*b* offering the same functions as in FIGS. 3 and 4. Thus, the positioning device 100*b* can be mounted to the other structural part 51*b* by inserting the guiding pin 121 and the expandable pin 122 in corresponding fixation holes 63*b* in the other structural part 51*b* (see FIG. 6).

Likewise, a clamp 141 is provided. The clamp 141 allows holding and fixing the coupling 52 to the other structural part 51*b*. Moreover, the positioning device 100*b* comprises a flange or protruding portion 213 carrying the identifier 133.

Thus, the flange or protruding portion 213 can faces a direction where a camera will capture an image of the first and second reflectors 131, 132, so that the identifier 133 is also visible for the camera.

It is to be understood that the other structural part 51*b* can likewise be coupled and fixed to the coupling 52 with a positioning device 100*a* as it is illustrated in FIGS. 3 and 4 but with a mirror-inverted setup.

In any case, when a camera 421, 422, 423 captures an image of the coupling 52 as well as both positioning devices 100*a,b*, the image includes four reflectors 131, 132 (two at each positioning device 100*a,b*) and two identifiers 133 (one at each positioning device 100*a,b*). Thus, a precise determination of the location and orientation of the two structural parts 51*a,b* and the coupling 52 is possible as six points in a three-dimensional space can be captured. As the pairs of fixation holes 63*a,b* and the location of the guidance faces 112, 113 are predefined, the location and orientation of the coupling 52 can be determined from the captured image.

Thus, the current location of the fastening device 400 (when capturing the image) can be set as a reference point or the fastening device 400 can be brought to a reference point after capturing the image. From there the fastening device 400 can move to each fastening position 71 automatically, i.e., without any readjustment or driving back to the reference point or the like. This allows mounting the fastening device 400 to a robot arm which is controlled based on the captured image information. Thus, a fast fastening of the structural parts 51*a,b* with the coupling 52 can be achieved and can be fully automated. The identifier 133 can further be employed to identify the type of coupling 52 or the pattern of the fastening positions 71, so that the fastening process can be automated, even in case of different patterns of fastening positions 71.

As a mere example, the camera(s) 421, 422, 423 can capture an image of the positioning devices 100 and determine the position of the structural parts 51, 52, 53 and the fastening positions 71, each time a fastener 72 is placed. Alternatively, the camera(s) 421, 422, 423 can capture an image of the positioning devices 100 once before the first fastener 72 is placed, and the position and orientation of the positioning devices 100, and hence the fastening positions 71, is only determined once as a reference point. All fasteners 72 are then placed based on this reference point automatically.

Figure 7:
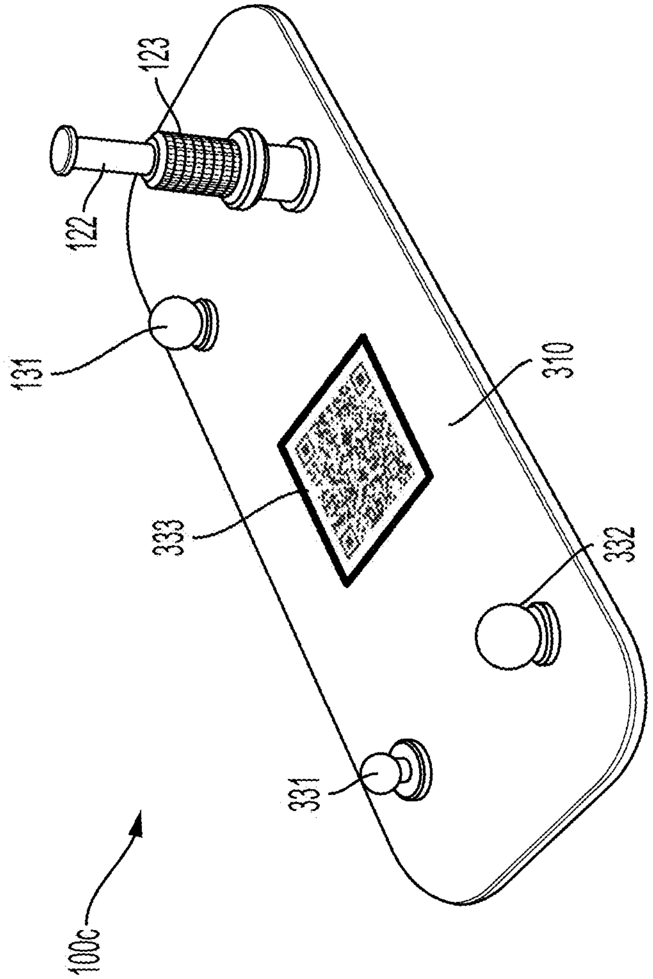
FIG. 7 schematically illustrates a further exemplary positioning device.
Figure 8:
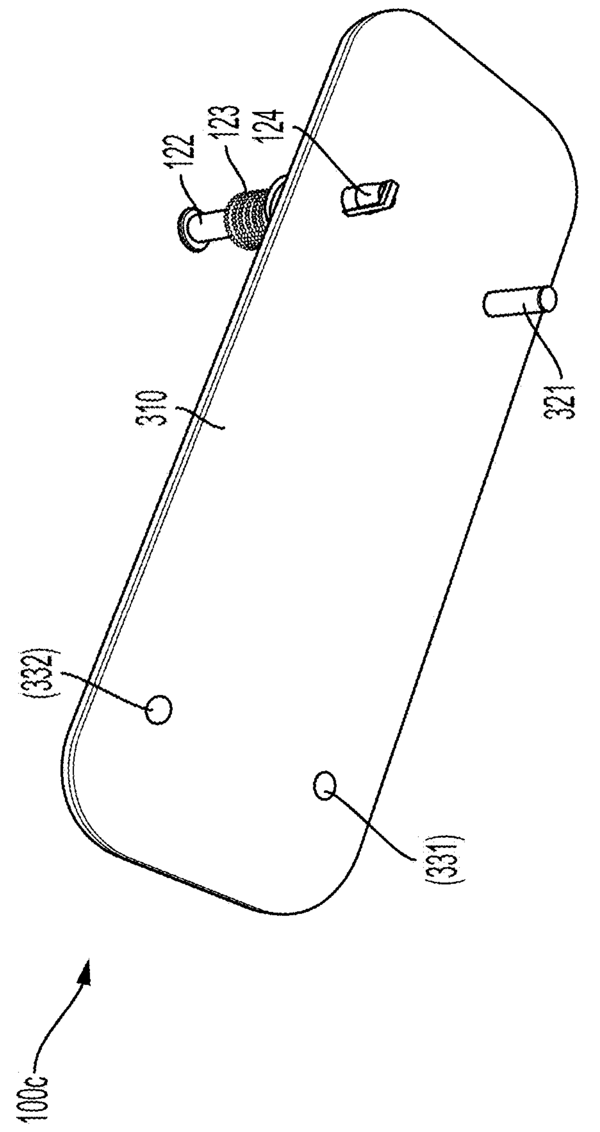
FIG. 8 schematically illustrates a different perspective of the positioning device of FIG. 7.

Turning to FIG. 2 and the details of the positioning device 100*c* in FIGS. 7 and 8. Specifically, a crossbeam 53 is to be mounted to a frame 51, both forming structural parts according to the present disclosure. Since the crossbeam 53 is significantly larger (wider) then the structural parts 51 of FIG. 1, the provision of a pair of reflectors on opposite sides may not be possible. Likewise, the area where the fastening device 400 has to operate when fastening the crossbeam 53 to the frame 51 is much smaller, so that only smaller angles of view for a camera 421, 422, 423 are possible compared to the situation in FIG. 1.

Thus, the crossbeam 53 is provided with a pair of fixation holes 63 in the same manner as described with respect to FIGS. 1 and 3 to 6. The positioning device 100*c* also comprises a guiding pin 321 and an expandable pin 122, which function as already described with respect to FIGS. 3 to 6. The only difference to guiding pin 321 compared to guiding pin 121 is that it includes only one reflector 131 on the second side of the plate 310 (visible in FIG. 7). Actually, the first side of the plate 310 (visible in FIG. 8) has only the guiding pin 321 and the expandable pin 122 protruding therefrom. Thus, FIG. 8 only illustrates positions of reflectors 331, 332 (the reference numerals have been placed in parentheses).

The guiding pin 321 and the expandable pin 122 are used to mount the positioning device 100*c* to the crossbeam 53 by inserting the guiding pin 321 and the expandable pin 122 into the fixation holes 63 in the crossbeam 53 (FIG. 2). Thus, the first side of the plate 310 abuts against a (upper) surface of the crossbeam 53.

The positioning device 100*c* comprises three reflectors in total, i.e., reflector 131 on guiding pin 121, as well as reflectors 331 and 332. When capturing an image of the positioning device 100*c*, the three reflectors 131, 331 and 332 allow a first determination of a position and orientation of the positioning device 100*c*. In order to enhance the determination of the position and orientation of the positioning device 100*c* and, hence, the crossbeam 53 and likewise the intersection/overlap between crossbeam 53 and frame 51, two images can be captured by two cameras 422 and 423 arranged at different positions. As a mere example, the cameras 422, 423 can be arranged along a line at the fastening device 400. Such line may correspond to a longitudinal axis of the crossbeam 53 or may correspond to a cross-sectional axis of the crossbeam 53.

It is to be understood that two positioning devices 100*c* could be installed on the crossbeam, or one positioning device 100*c* is installed on the crossbeam and another positioning device 100 (not illustrated) is installed on the frame 51, in order to increase the number of reflectors to be captured by the cameras 421, 422, 423. However, a solution including only one positioning device 100*c* requires fewer fixation holes 63 in the structural parts 51, 53.

With reference to all positioning devices 100*a,b,c* it is to be noted that at least one reflector 131, 132, 331, 332 can have a different size than the other reflectors 131, 132, 331, 332. For instance, reflector 132 in FIGS. 3 to 6 is smaller (in diameter) than reflector 131. This allows, on the one hand, insertion of the guiding pin 121 into the associated fixation hole 63. On the other hand, it allows determination of the orientation of the positioning device 100*a,b,c* as the reflectors 131, 132 themselves can be determined by their size. In the exemplary positioning device 100*c* of FIGS. 7 and 8, reflector 331 is made smaller (in diameter) than the remaining reflectors 131 and 332.

It is further to be understood that in case of three reflectors or more, each of the reflectors 131, 132, 331, 332 can have a unique size and/or form, so that the reflectors 131, 132, 331, 332 can be differentiated from one another. This facilitates determination of the position and orientation of the respective positioning device 100*a,b,c*.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A positioning device, comprising:
- a plate forming a main body of the positioning device having a first side and a second side opposite to the first side;
- a guiding pin mounted to the plate and extending perpendicularly from the first side of the plate;
- an expandable pin mounted to the plate, wherein an expandable portion of the expandable pin extends perpendicularly from the first side of the plate;
- at least two reflectors; and
- an identifier, the identifier capable of being recognized by a reader,
- wherein the at least two reflectors and the identifier are not located on a common straight line.

2. The positioning device according to claim 1, wherein at least one of:
- the at least two reflectors are all arranged on the second side of the plate, or
- one reflector of the at least two reflectors is arranged at a free end of the guiding pin arranged on the first side of the plate, and all remaining reflectors of the at least two reflectors are arranged on the second side of the plate.

3. The positioning device according to claim 1, further comprising a clamp mounted to the second side of the plate.

4. The positioning device according to claim 3, wherein the clamp comprises a free end extending over an edge of the plate.

5. The positioning device according to claim 3, wherein the clamp comprises a slot configured to move the clamp rotationally and linearly.

6. The positioning device according to claim 1, further comprising at least one guidance face protruding from the plate.

7. The positioning device according to claim 1, wherein the identifier includes at least one of a machine-readable code or a reflecting portion.

8. A method for mounting two structural parts to one another, the method comprising:
- providing a pair of fixation holes into a first structural part;
- mounting a positioning device according to claim 1 to the first structural part by inserting the guiding pin into a first hole of the pair of fixation holes, inserting the expandable pin into a second hole of the pair of fixation holes, and expanding the expandable portion of the expandable pin;
- positioning a second structural part relative to the first structural part;
  - capturing an image of the positioning device including the at least two reflectors and the identifier;
- arranging a fastening device relative to an intersection between the first and second structural parts based on a location of the at least two reflectors and the identifier captured in the image; and
- fastening the first and second structural parts to one another by the fastening device.

9. The method according to claim 8, wherein capturing an image comprises capturing a first image of the positioning device with a first camera and a second image of the positioning device with a second camera.

10. The method according to claim 8, wherein positioning the second structural part comprises clamping the second structural part to the first structural part using a clamp of the positioning device.

11. The method according to claim 8, wherein mounting the positioning device comprises inserting the guiding pin through the first hole of the pair of fixation holes to such an extent that a first reflector arranged at one end of the guiding pin and a second reflector arranged at an opposite other end of the guiding pin each extend over a side surface of the first and second structural parts.

12. The method according to claim 8, wherein fastening the first and second structural parts comprises placing a plurality of self-piercing fasteners through the first and second structural parts.

13. The positioning device according to claim 1, wherein the identifier is an optically recognizable feature.

* * * * *